Patented Mar. 20, 1923.

1,449,105

UNITED STATES PATENT OFFICE.

FRIEDRICH HAYDUCK, OF WILMERSDORF, GERMANY, ASSIGNOR TO THE FLEISCH-MANN COMPANY, OF NEW YORK, N. Y., A CORPORATION OF OHIO.

LOW-ALCOHOL YEAST PROCESS.

No Drawing.   Application filed October 30, 1920.   Serial No. 420,832.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Low-Alcohol Yeast Processes (for which an application for patent was filed in Germany March 16, 1915, Patent No. 300,662), of which the following is a specification.

This invention relates to a process for the manufacture of yeast and particularly to a process for manufacturing a compressed bakers' yeast in which very little alcohol is produced as a by-product, and has for its object an improved procedure for manufacturing yeast in a more convenient and economical manner than heretofore.

In the manufacture of yeast according to the usual aeration process, large quantities of alcohol are generated, the amount of which is to some extent dependent on the sugar available for the yeast.

Efforts have been made to produce economical conditions under which not only an increase of the yeast yield from the raw material used would be insured, but a simultaneous diminution of the alcohol yield would be obtained. It has therefore already been suggested to dilute the wort to such an extent that the alcohol produced from the sugar could supposedly again be assimilated by the yeast as nourishment. The process disclosed in the German patent to Rainier, 10135, endeavors to reach this goal by adding the nutrient required for the yeast (sugar and peptone), in a manner which would produce this result, i. e., by adding the peptones continuously and the sugar at intervals, as required, and whenever analysis showed the need thereof, stating that in keeping the concentration of the sugar very low the formation of alcohol is prevented and the sugar is used only as a nutrient. In the operations set forth by this patent, the very low concentration of the sugar solution which is added from time to time to the fermenting wort, requires the use of large tanks and apparatus to handle the large volume of liquid. However, the increase in operating costs connected with this high dilution is partly compensated for by the advantage of the high yield in the yeast.

In the process described hereinafter and forming the subject of this invention, the goal of obtaining a high yeast yield with little or no formation of alcohol is reached by the use of worts of normal quality and concentration, the wort being added to the yeast continuously and at a rate such that no large excess of alcohol will be formed, and the yeast can assimilate most of the alcohol which is so formed.

The process may be, for example, executed in the following manner:

A wort adapted for yeast propagation (having, for example, a gravity of 12° Balling) is prepared according to the procedure commonly followed in the compressed yeast industry. A part of this wort is placed in the fermenting vat and is highly diluted (for example, to about 1° Balling), yeast is added thereto and it is aerated. Thereupon the remainder of the concentrated wort is added slowly and substantially continuously throughout a protracted period of time and at a rate such that not only the alcohol which may have been formed from the quantity of sugar present in the diluted portion of the wort, but also any alcohol which may be formed from the sugar which is present in the added wort, can be assimilated immediately by the yeast. If arrangements are made to carry on the aeration process for ten hours, the addition of the wort may be effected for about seven to eight hours under continuous aeration and the aeration may be subsequently continued for two to three hours without the addition of any wort. The quantity of the diluted wort which is originally available for the yeast is so chosen, for example, that the mean content of the entire wort employed would be 3° to 5° Balling.

As compared with the obtaining of yeast from worts of very small concentration, the process described above offers the advantage that the yeast is constantly given new supplies of all nutrient constituents necessary for its propagation by the continuous addition of concentrated wort, and that thereby as a result of the continual consumption of the nutrients by the yeast, there is always a wort concentration, by means of which the nutrients and the resultant substances are absorbed most efficaciously and quickly by the yeast, that is to say, there is offered in this manner of procedure through the peculiar distribution of the wort, the advantage of great dilution, while the concentration of the wort (calculated for the entire quantity) remains normal.

In the process in accordance with German Patent 10135, the intermittent or continuous addition of the peptones or the intermittent successive addition of sugar to the liquid containing the yeast is provided for by making use of the high dilution, which favors the growth of the yeast at the expense of the formation of alcohol. But, aside from the fact that this process requires constant supervision of the conditions of nutrition obtaining in the liquid, as sugar and peptone can only be added separately and as required, this process does not provide for work with normally concentrated liquids, nor does it disclose the propagation of yeast in a wort of usual constitution, the resultant wort used for the propagation of yeast having a peptone sugar ratio of 2/1. Moreover, the operation of this process requires the estimation of the sugar and peptone content prior to further additions of the respective solutions containing these nutrients, and it therefore lacks the simple operation characterizing the process herein described, which does not differ in any way, in regard to the production of the wort and the amount of labor required, from the usual procedure followed in the manufacture of aerated yeast.

In the manufacture of compressed yeast, the starting of the primary, undiluted wort with yeast, and the adding of the secondary wort, which is being constantly diluted, is a known method, the concentrated wort from the mash process being filtered from the draff and led into the fermenting vat. After a portion of this wort has been run into the vat, the seed yeast is added, and while the thus seeded portion is being aerated the remainder of the concentrated mash is filtered and run into the fermenting vat together with a stream of water, the sparge water being later run into the fermenting vat in the same manner. The amount of water which is constantly run into the vat as the wort is added is so regulated that after all of the concentrated mash wort, the sparge water and the added water have been put into the vat so as to fill the same, the wort will have the required concentration. The conditions for propagating the yeast in the best possible manner are considered to be fulfilled, when all of the filtered wort and sparge water are added in the shortest possible time. It will thus be seen that the propagation begins in a relatively concentrated solution, and that the concentration thereof is decreased gradually, partly because the nutrient substances are being consumed by the yeast and partly because the addition of water and sparge water gradually reduce the initial concentration of the wort. In this procedure, in which, therefore, the opposite principle is followed, such large quantities of alcohol are generated from the very start, that no appreciable assimilation of the alcohol can take place.

Having described my invention what I claim as new and desire to secure by Letters Patent is—

1. A process of propagating yeast which comprises, initiating propagation of yeast in a dilute nutrient solution containing all essential yeast nutrients, aerating the solution, and substantially continuously adding during the period of propagation, a solution containing all essential yeast nutrients.

2. A process of propagating yeast which comprises, preparing a wort containing all essential yeast nutrients in solution, initiating propagation of yeast in a diluted portion of said wort, and substantially continuously adding during the period of propagation, the wort of higher concentration.

3. A process of propagating yeast which comprises, preparing a wort containing all essential yeast nutrients in solution, initiating propagation of yeast in a diluted portion of said wort, aerating the diluted portion, and substantially continuously adding during the period of propagation, the wort of higher concentration.

4. A process of propagating yeast with a relatively low yield of alcohol which comprises preparing a wort containing all essential yeast nutrients in solution, initiating propagation of yeast in a diluted portion of said wort, aerating the diluted portion, and substantially continuously adding during the period of propagation, a wort of higher concentration, at a rate such that the yeast may propagate and substantially all of the alcohol which may be formed is assimilated by the yeast.

5. A process of propagating yeast with a relatively low yield of alcohol which comprises, preparing a wort containing all essential yeast nutrients in solution, initiating propagation of yeast in a diluted portion of said wort, aerating the diluted portion, and slowly and substantially continuously adding during the period of propagation, the wort of higher concentration.

6. A process of propagating yeast with a relatively low yield of alcohol which comprises, preparing a wort containing all essential yeast nutrients in solution, initiating propagation of yeast in a diluted portion of said wort, aerating the diluted portion and slowly and substantially continuously adding the wort of high concentration, which addition is effected until near the end of the period of propagation.

7. A process of propagating yeast which comprises, preparing a dilute wort and a relatively concentrated wort, each containing all essential yeast nutrients in solution, initiating propagation of yeast in the dilute wort, aerating the dilute wort and substantially continuously adding during the period of propagation, the wort of higher concentration.

8. A process of propagating yeast with a relatively low yield of alcohol which comprises, preparing a wort containing all essential yeast nutrients in solution, initiating propagation of yeast in a diluted portion of said wort, aerating the diluted portion, and substantially continuously adding during the period of propagation, the wort of higher concentration at a rate such that the yeast may propagate and substantially all of the alcohol which may be formed is assimilated by the yeast.

9. A process of propagating yeast with a relatively low yield of alcohol which comprises, preparing a wort containing all essential yeast nutrients in solution, initiating propagation of yeast in a diluted portion of said wort, aerating the diluted portion, and substantially continuously adding during the period of propagation, the wort of higher concentration at a rate such that the concentration of the dilute wort does not rise above that at which substantially all of the alcohol which may be formed, will be assimilated by the yeast.

10. A process of propagating yeast with a relatively low yield of alcohol which comprises, preparing a wort containing all essential yeast nutrients in solution, initiating propagation of yeast in a highly diluted portion of said wort, aerating the diluted portion, and substantially continuously adding during the period of propagation, the wort of higher concentration at a rate such that the concentration of the dilute wort remains substantially constant, whereby substantially all of the alcohol which may be formed is assimilated.

In testimony whereof, I have affixed my signature.

FRIEDRICH HAYDUCK.